United States Patent [19]

Simon et al.

[11] 4,396,247
[45] Aug. 2, 1983

[54] METHOD FOR FITTING AN OPTICAL FIBER INTO AN END FITTING, THE RESULTING END FITTING AND A CONNECTING ASSEMBLY FOR OPTICAL FIBERS USING THIS END FITTING

[75] Inventors: Jacques Simon; Jean V. Bouvet; Raymond Henry, all of Paris, France

[73] Assignee: Thomson-CSF, Paris, France

[21] Appl. No.: 155,965

[22] Filed: Jun. 3, 1980

[30] Foreign Application Priority Data

Jun. 8, 1979 [FR] France .................. 79 14719

[51] Int. Cl.³ .............................................. G02B 7/26
[52] U.S. Cl. ................... 350/96.20; 350/96.21; 350/320; 29/458
[58] Field of Search ............. 350/96.20, 96.21, 96.22, 350/320; 29/458

[56] References Cited

U.S. PATENT DOCUMENTS

| | | | |
|---|---|---|---|
| 3,914,880 | 10/1975 | Dakss et al. | 350/96.21 |
| 4,135,781 | 1/1979 | Archer | 350/96.20 |
| 4,142,776 | 3/1979 | Cherin et al. | 350/96.21 |
| 4,307,935 | 12/1981 | Monnier | 350/96.20 |
| 4,326,771 | 4/1982 | Henry et al. | 350/96.17 |

FOREIGN PATENT DOCUMENTS

| | | | |
|---|---|---|---|
| 53-28441 | 3/1978 | Japan | 350/96.20 |
| 2033099 | 5/1980 | United Kingdom | 350/96.20 |

Primary Examiner—John D. Lee
Assistant Examiner—Frank Gonzalez
Attorney, Agent, or Firm—Oblon, Fisher, Spivak, McClelland & Maier

[57] ABSTRACT

A method for fitting an optical fiber in an end fitting, the end fitting obtained constituting a connection device for connecting to another connecting device incorporating an optical fiber. A hollow cylindrical support whose lateral surface constitutes the reference surface for the position of the fiber is machined and the terminal portion of the fiber is coated with electrolytic gold deposit in the form of a frustum. Then the fiber is self-centered by force inserting the frustum and the terminal portion of the fiber which it covers in the hollow support. Levelling then occurs at the butting face of the fiber by sawing and/or grinding the projecting portions of both the frustum and fiber.

11 Claims, 8 Drawing Figures

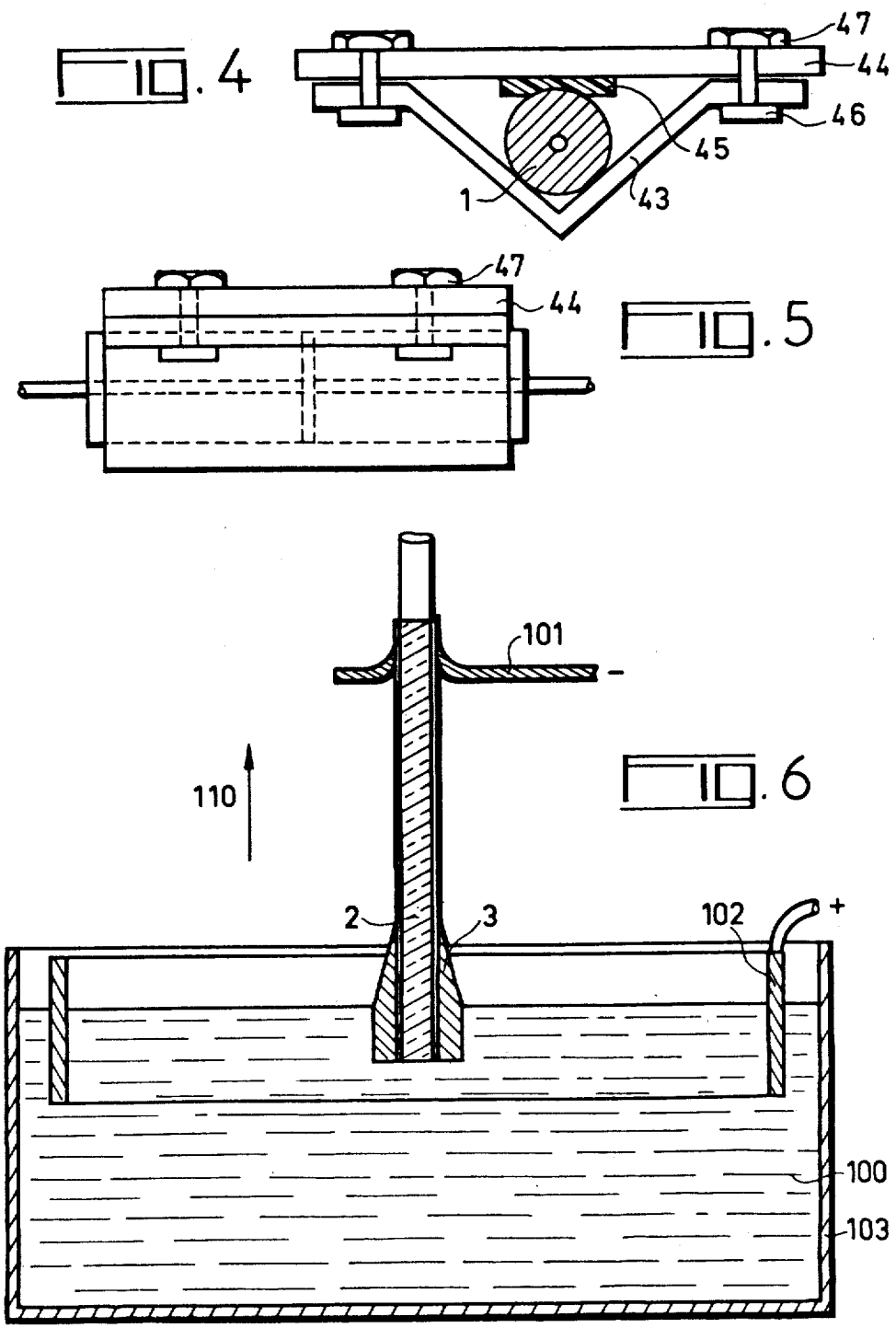

METHOD FOR FITTING AN OPTICAL FIBER INTO AN END FITTING, THE RESULTING END FITTING AND A CONNECTING ASSEMBLY FOR OPTICAL FIBERS USING THIS END FITTING

BACKGROUND OF THE INVENTION

1. Field of the Invention

The invention relates to a method for fitting an optical fiber into an end fitting, the end fitting obtained in this way constituting a device for connecting to another connecting device incorporating an optical fiber. It also relates to any connecting assembly containing such an end fitting and, in particular, an optoelectronic connector.

2. Description of the Prior Art

Optical fibers used for long distance telecommunications (several dozen kilometers) and with a high information flow (more than 500 megabits/second for one kilometer) are fibers with a core smaller than 0.070 mm (70 microns).

The tendency to use optical fibers with a very small diameter is justified by the theory of the transmission of the light wave in the fiber. In addition, the reduction in the diameter has an economic significance, because the smaller the fiber diameter the greater the fiber length which can be drawn from a preform with standard dimensions. It is known that the length of fiber drawn from a given preform is inversely proportional to the square of the diameter of the said fiber. It is important to obtain maximum optical fiber lengths in order to limit the number of connections by splicing (adhesion or welding) or by removable connectors.

In the telecommunications field the admissible losses on a homogeneous fiber length containing no connection is below 10 and sometimes below 0.5 dB/km. The insertion loss introduced by a connection should only very slightly exceed the order of magnitude of the theoretical losses, i.e. 0.2 dB. Such a result assumes that it has been possible to bring about the almost perfect alignment of the cores of the fibers to be connected, after polishing or splitting the faces to be joined end to end and moving them into abutting relationship, whilst only leaving a negligible air layer thickness.

The practical realisation of such a connection necessitates the production of a mechanical hollow support which surrounds and fixes in place the end of the optical fiber. This support constitutes or forms part of a more or less complicated connecting device permitting abutting of the mechanical supports located around the ends of the two fibers to be connected.

The mechanical support or end fitting of each fiber materializes a reference surface, which is for example the lateral surface or given portions thereof on the periphery of a cylindrical or frustum-shaped body. This reference surface defines the position of the optical fiber, which must, for example, be accurately positioned in accordance with the axis of the cylinder or the frustum. In practice the fiber core has a diameter of approximately 1/10 mm (100μ), whilst the diameter of the end fitting of the abutting face is several dozen times larger. The positioning of the optical fiber in the end fitting requires the use of complex precision equipment. The very nature of the fiber and in particular its fragility leads to the presence of relatively flexible protective means adding to the complexity of the problem referred to hereinbefore.

BRIEF SUMMARY OF THE INVENTION

The object of this invention is to solve this problem of the prior art by providing a technologically simple and accurate method for providing an end fitting which satisfies the conditions referred to hereinbefore.

According to the method of the invention an optical fiber is mounted in an end fitting constituting a mechanical support having an external reference surface and having a cavity formed thereon for fixing one end of the optical fiber level with the jointing face of the said fiber. The method comprises at least the following steps:

(a) machining a mechanical support having one or more external reference surfaces, an abutting face and a cavity whose dimensions are fixed with a wider tolerance than the tolerance fixed for the position of the optical fiber core;

(b) deposition of a frustrum-shaped metal coating surrounding the end of the optical fiber, said metal coating having a thickness which remains constant in an orthogonal section of the fiber and which decreases progressively in a given direction, the maximum thickness of the metal coating being such that the fiber is fixed without being able to disengage the support when said fiber is slid into the cavity of the mechanical support;

(c) locking of the optical fiber with its metal coating in the cavity of the mechanical supports; and (d) sawing or grinding the fiber coated with its metal coating in the plane of the joining face.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 4 is a cross-sectional view of a connecting assembly joining two end fittings in accordance with the present invention;

FIGS. 5 and 8 show systems for connecting fibers provided with end fittings according to the invention; and FIG. 6 shows a stage in the electrolytic deposition of the metal coating during the method of the invention.

DETAILED DESCRIPTION OF THE PREFERRED EMBODIMENTS

Figure 1:
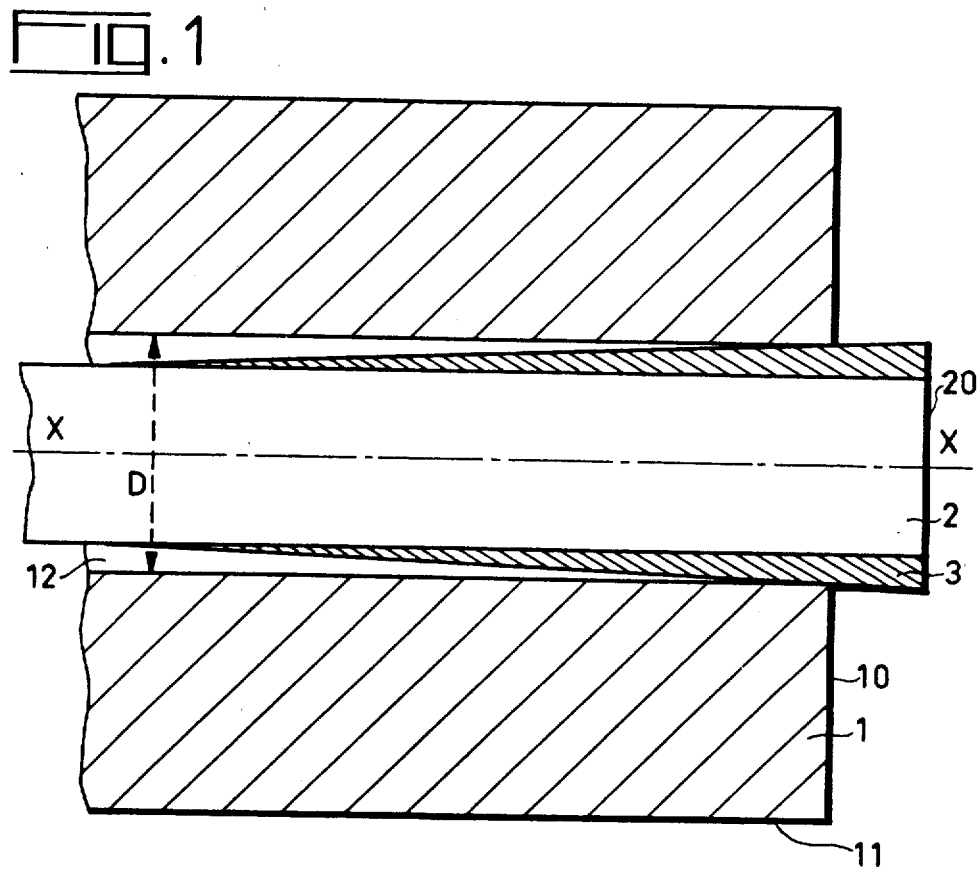
FIG. 1 is a diagrammatic sectional view through a portion of an end fitting during installation at a given stage of the invention.

FIG. 1 is a sectional view of a cylindrical mechanical support 1 having a central cavity 12 which is merely a cylindrical hole of diameter D. The support is traversed by an optical fiber 2 coated with a frustum-shaped metal coating 3, whose large end is interrupted at an unfinished terminal face of the optical fiber. The latter has been threaded into the hole 12, prior to the deposition of metal coating 3, because the optical fiber can be of considerable length and may be stored, for example, on a reel.

During machining stage (a) discussed hereinbefore support 1 is produced, for example, from a solid cylindrical copper or steel blank, which is machined on the lathe or on a grinder to give it a cylindrical shape with a diameter tolerance below 1/100 mm. A cylindrical hole is then drilled and its axis coincides with the axis XX of the support with a tolerance of a few hundredths of a mm on the diameter. However, it is perfectly centered and the abutting face 10 of support 1 is levelled and smoothed. This work can be carried out with miniaturized lathes. Only the lower limit (the optical fiber diameter after removing the protective sheath) of the diameter D of the central hole is fixed and its upper limit can reach a tolerance of about 1/100 mm.

Stage (b) involving the deposition of the metal coating is, for example performed in two sub-stages.

In a first sub-stage the fiber or fibers 2 are introduced into a cathodic sputtering apparatus (or any other system giving a thin metal film). After several minutes a metal deposit is obtained having an adequate regularity and adhesion to carry out the following sub-stage. It is also possible to deposit a film of gold or some other metal by an electrolytic process of the electrodeless type or by vacuum evaporation or by chemical means.

In a second sub-stage shown in FIG. 6 the metal-coated end of the optical fiber or fibers is immersed in an electrolysis bath 100 contained in a cylindrical tank 103 which constitutes an electrode, the other electrode being constituted by one or more metal cylinders 102. Salts of gold, nickel, tin or some other metal having an electrolyzable salt are used for forming bath 100. The electrical connection of fiber 2 is made by means of a flexible connection 101 surrounding the metal-coated part 20.

During electrolysis the fiber is moved in the direction of arrow 110 in a slow, regular bottom to top manner, without returning to the bottom. The bath can be allowed to flow out. Due to the circular shape of electrode 102 and the central position of the fiber in bath 100, the metal deposit has a constant thickness at a given cross section. In other words the metal coating is self-centered. The slope with respect to the axis of the generatrix of the frustum corresponds to a cone apex angle of approximately 3° to 45°.

To obtain an inverted frustum-shaped metal coating, i.e. with a minimum thickness at the end, it is merely necessary to introduce the fiber into a curved sheath submerged in bath 100. The fiber end can be advanced from bottom to top by progressively immersing the electrolyte. Metal coating 3 can be covered with a thin protective metal film which is able to act as a barrier layer during welding to the end fittings to be described hereinafter.

During the fitting of the frustum to the end fitting, i.e. during stage (c) the fiber is stretched so as to lock the frustum-shaped metal coating at the inlet orifice to the abutting face 10. The fiber is fixed in the stretched position by supplying resin, glue or weld metal (not visible in FIG. 1) to at least part of the fiber within cavity 12.

During the levelling stage (d) the portion of the metal-coated end which emerges from face 10 is cut by sawing and/or grinding.

In a complementary stage it is possible to weld the metal coating 3 to support 1 by high temperature welding.

Figure 2:
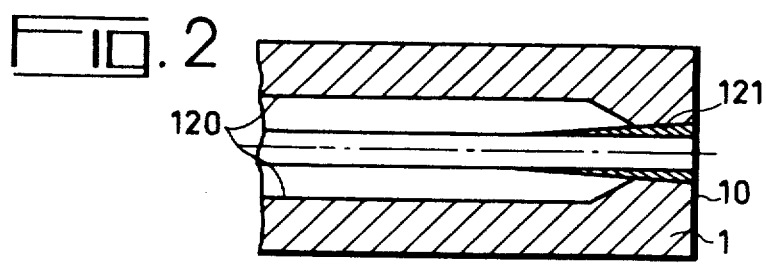
FIGS. 2, 3 and 7 show various alternate embodiments of the invention.

In the embodiment shown in FIG. 2 the mechanical support has a cavity 120, whose diameter is much larger than the diameter D of cavity 12, except in the vicinity of the joining face 10. In the corresponding part of the end fitting the inner wall 121 of the central perforation has a frustum shape, whose apex angle is equal to or less than the apex angle of frustum 3. This variant reduces the risks of deterioration to the metal of the end of the fiber during the locking of the metal coating in the end fitting, due to metal burrs on hole 12 level with face 10, such as may occur in the main method.

Figure 3:
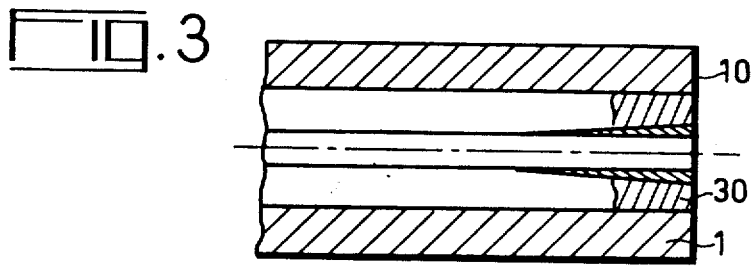

In a second embodiment of FIG. 3 the support 1 is a cylindrical sleeve made of hard material for example hardened steel, ceramic or glass, which can be machined by grinding. A block 30 of a material which can easily be machined and constituted for example by resin or a tin alloy is added to the end on the side of the abutting face. This block is then machined to obtain a frustum-shaped hole, as in the previous embodiment.

Figure 7:
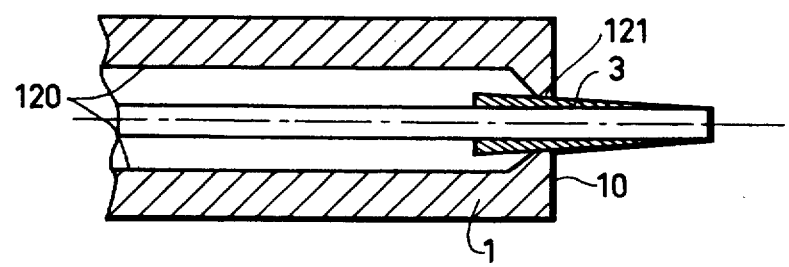

In a third embodiment according to FIG. 7 the metal coating has an oppositely directed frustum shape. There is once again a large diameter cavity 120 in support 1 as shown in FIG. 2, but this cavity is extended much closer to the abutting face 10 than in the case of FIG. 2, so as to leave a substantially cylindrical limited length tunnel 121.

The end fitting is shown at stage (c). These arrangements facilitate the machining of the end fitting without destroying its effectiveness.

FIGS. 4 and 5 are cross sectional and elevational views, respectively, of a connecting assembly joining two end fittings 41 and 42 according to the invention. In addition to the end fittings the assembly has a V-shaped portion 43, a clip 44 carrying an elastic material plug 45 and connecting means such as screw 46 and nut 47.

The method according to the invention makes it possible to fit an end fitting on a fiber end in all cases where there is a sufficient fiber length from which the protective sheath can be removed and more particularly in the case of a short monofiber for connecting an optoelectronic component, a monofiber stored on a reel and a fiber of a multiple cable stored on a reel. However, when a cable is installed in the open country, stages of method can only be easily performed in a workshop having the necessary equipment on a short fiber length. After fitting the end fitting to a short length of fiber, which has previously been bared, splicing is carried out with a long fiber, one end of which has been bared. It is at present possible to splice optical fibers, even on site.

Figure 8:
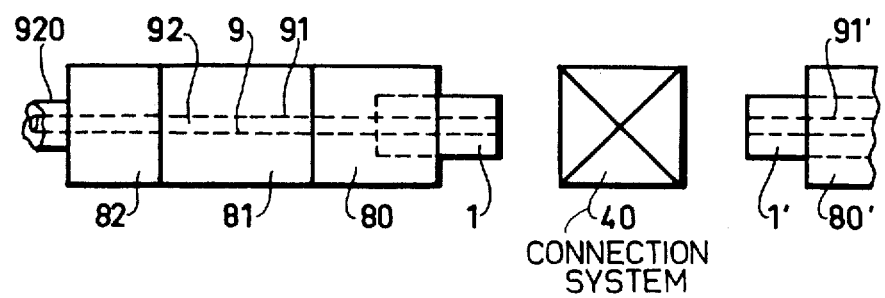

FIG. 8 diagrammatically shows in an exemplified manner a connecting system joining by means of a connecting assembly (identical to that of FIG. 4) with two short fibers 91 and 91' respectively equipped with end fittings 1 and 1' according to the invention. Fibers 91 and 91' have, for example, been equipped with their respective end fittings in the factory.

Fiber 91 is connected to a fiber 92, whose protective sheath 920 has previously been removed for a sufficient length. The connection is carried out by splicing in a splicing sleeve 81, shown symbolically in FIG. 8 which is itself fixed to the end fitting 1 by a symbolically indicated locking system 80. The sleeve is connected to a stuffing box 82 which grips the sheath 920 to protect fiber 92 from mechanical failures during the manipulation of the connecting assembly.

The invention provides the following additional advantages: The metal coating cone is made with no deterioration to the geometrical and optical characteristics of the fiber; the ease of using the end fitting in a connecting assembly; and the possibility of making the interface between end fitting and fiber hermetic due to the welding thereof, no matter what may be the surface state of the inner part of the end fitting.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for fitting an optical fiber into an end fitting which includes a mechanical support having an outer surface and a cavity formed therein for fixing one end of the optical fiber level with the abutting face of said support, which comprises:

machining said mechanical support so as to have at least one external surface, an abutting face and a cavity formed therein;

depositing a frustum-shaped metal coating so as to surround the end of the optical fiber, said metal coating having a thickness which remains constant in an orthogonal section of the fiber and which decreases progressively in a given direction, the maximum thickness of the metal coating being such that the fiber is fixed without being able to disengage the support when said fiber positioned within the cavity of the mechanical support;

locking the optical fiber with said metal coating in the cavity of the mechanical support; and removing the fiber coated with said metal coating in the plane of the abutting face.

2. A method according to claim 1, wherein said step of depositing a coating further comprises depositing a very thin homogeneous metal film on the end of the optical fiber, and electrolytically depositing a frustum-shaped metal coating on said end of the optical fiber.

3. A method according to claim 1, wherein the value of slope angle with respect to the axis of the fiber of a frustum generatrix of said frustum-shaped metal coating is between 3° and 45°.

4. A method according to claim 1, wherein said step of depositing said coating further comprises welding the metal coating to the end fitting.

5. A method according to claim 1, wherein said step of machining said cavity in said support further comprises forming a cylindrical hole therein.

6. A method according to claim 1, wherein said step of machining said support further comprises fitting a block of material in said support which differs from the material of said support and wherein said block further comprises a sleeve.

7. A method according to claim 1 wherein said step of machining said cavity and said support further comprises forming a frustum-shaped hole therein.

8. An end fitting comprising: a mechanical support, having a cavity formed therein about an axis of revolution of said support; and an optical fiber having a frustum-shaped metal coating mounted in said cavity; wherein a planar face of said fiber containing a cross section of said metal coating further comprises an abutting face for the end fitting.

9. An end fitting mounted in accordance with claim 8, wherein the mechanical support further comprises a cylindrical sleeve and a block of material having an axial perforation formed therein and joined to the center of the sleeve and containing the fiber in said axial perforation within the block.

10. A connecting assembly for first and second optical fibers comprising:

an end fitting which includes a mechanical support, having a cavity formed therein about an axis of revolution of said support and an optical fiber having a frustum-shaped metal coating mounted in said cavity wherein a planar face of said fiber containing a cross section of said metal coating further comprises an abutting face for the end fitting; and a V-shaped mechanical part defining the position of the end fitting.

11. A connecting assembly according to claim 10 wherein said connecting assembly further comprises splicing connection means for connecting said first and second fibers.

* * * * *